(12) United States Patent
Woodruff et al.

(10) Patent No.: US 12,358,217 B2
(45) Date of Patent: Jul. 15, 2025

(54) THREE-DIMENSIONAL PRINTING WITH FLAME RETARDANT

(71) Applicant: PERIDOT PRINT LLC, Palo Alto, CA (US)

(72) Inventors: Shannon Reuben Woodruff, San Diego, CA (US); Graciela Emma Negri Jimenez, San Diego, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 18/269,744

(22) PCT Filed: Jan. 8, 2021

(86) PCT No.: PCT/US2021/012663
§ 371 (c)(1),
(2) Date: Jun. 26, 2023

(87) PCT Pub. No.: WO2022/150043
PCT Pub. Date: Jul. 14, 2022

(65) Prior Publication Data
US 2024/0316861 A1    Sep. 26, 2024

(51) Int. Cl.
*B29C 64/165*    (2017.01)
*B29K 77/00*    (2006.01)
(Continued)

(52) U.S. Cl.
CPC ............ *B29C 64/165* (2017.08); *B33Y 10/00* (2014.12); *B33Y 70/10* (2020.01); *B29K 2077/00* (2013.01); *B29K 2995/0016* (2013.01)

(58) Field of Classification Search
CPC ....... B29C 64/165; B33Y 10/00; B33Y 70/00; B29K 2077/00; B29K 2995/0016
See application file for complete search history.

(56) References Cited

U.S. PATENT DOCUMENTS 11,008,458 B2 *   5/2021   Jogikalmath ............. B32B 5/30
2013/0136911 A1 *   5/2013   Bender ............. C07F 9/657172
428/221
(Continued)

FOREIGN PATENT DOCUMENTS

CN          108219405 A        6/2018
JP          2016510077 A   *   4/2016    ............. C08L 63/00
(Continued)

*Primary Examiner* — Nahida Sultana
(74) *Attorney, Agent, or Firm* — Dierker & Kavanaugh, P.C.

(57) ABSTRACT

A three-dimensional printing kit can include a build material, a fusing agent, and a flame retardant. The build material can include polyamide particles. The fusing agent can include a radiation absorber to generate heat from absorbed electromagnetic radiation and an aqueous liquid vehicle including water. The flame retardant can include 9,10-dihydro-9-oxa-10-phosphaphenanthrene-10-oxide. The flame retardant can be included at from about 5 wt % to about 30 wt % in the fusing agent, at from about 5 wt % to about 30 wt % in a flame retardant agent if present that is separate from the fusing agent, or at from about 5 wt % to about 30 wt % in the fusing agent and from about 5 wt % to about 30 wt % in the flame retardant agent.

16 Claims, 3 Drawing Sheets

(51) Int. Cl.
   *B33Y 10/00*   (2015.01)
   *B33Y 70/10*   (2020.01)

(56) References Cited

U.S. PATENT DOCUMENTS

| | | |
|---|---|---|
| 2019/0030799 A1 | 1/2019 | Chen et al. |
| 2019/0048188 A1* | 2/2019 | Jogikalmath .......... C09K 21/14 |
| 2019/0119424 A1 | 4/2019 | Sommer et al. |
| 2020/0247995 A1 | 8/2020 | Marchese et al. |
| 2022/0073547 A1* | 3/2022 | Bonyhady ............ C08G 63/183 |

FOREIGN PATENT DOCUMENTS

| | | |
|---|---|---|
| WO | 2019/182579 A1 | 9/2019 |
| WO | 2020/158647 A1 | 8/2020 |
| WO | 2020/251917 A1 | 12/2020 |

\* cited by examiner

THREE-DIMENSIONAL PRINTING WITH FLAME RETARDANT

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques can be considered additive processes because they involve the application of successive layers of material. This can be unlike other machining processes, which often rely upon the removal of material to create the final part.

DETAILED DESCRIPTION

Three-dimensional printing can be an additive process involving the application of successive layers of a build material with a fusing agent printed thereon to bind the successive layers of the build material together. More specifically, a fusing agent including a radiation absorber can be selectively applied to a layer of a build material on a support bed, e.g., a build platform supporting build material, to pattern a selected region of a layer of the build material. The layer of the build material can be exposed to electromagnetic radiation, and due to the presence of the radiation absorber on the printed portions, absorbed light energy at those portions of the layer having the fusing agent printed thereon can be converted to thermal energy, causing that portion to melt or coalesce, while other portions of the build material do reach temperatures suitable to melt or coalesce. This can then be repeated on a layer-by-layer basis until the three-dimensional object is formed.

In accordance with this, a three-dimensional printing kit (or "kit") can include a build material, a fusing agent, and a flame retardant. The build material can include polyamide particles. The fusing agent can include a radiation absorber to generate heat from absorbed electromagnetic radiation and an aqueous liquid vehicle including water. The flame retardant can include 9,10-dihydro-9-oxa-10-phosphaphenanthrene-10-oxide. The flame retardant can be included at from about 5 wt % to about 30 wt % in the fusing agent, at from about 5 wt % to about 30 wt % in a flame retardant agent if present that is separate from the fusing agent, or at from about 5 wt % to about 30 wt % in the fusing agent and from about 5 wt % to about 30 wt % in the flame retardant agent. In an example, the polyamide particles can have a D50 particle size from about 2 μm to about 150 μm. In another example, the polyamide of the polyamide particles can be selected from polyamide-6, polyamide-9, polyamide-11, polyamide-12, polyamide-66, polyamide-612, polyamide-812, polyamide-912, thermoplastic polyamide, or a combination thereof. In yet another example, the radiation absorber can include carbon black, a metal dithiolene complex, a near-infrared absorbing dye, a near-infrared absorbing pigment, metal nanoparticles, a conjugated polymer, or a combination thereof. In a further example, the radiation absorber can be present in the fusing agent at from about 0.1 wt % to about 10 wt %. In one example, the flame retardant can be present at from about 15 wt % to about 25 wt % in the fusing agent, or at from about 15 wt % to about 25 wt % in a flame retardant agent, or at from about 15 wt % to about 25 wt % in both the fusing agent and the flame retardant agent. In another example, the three-dimensional printing kit can include the flame retardant agent and the flame retardant can be present in the flame retardant agent. In yet another example, the kit can further include a detailing agent. The detailing agent can include a detailing compound to reduce a temperature of the build material onto which the detailing agent is applied.

In another example of the present disclosure, a method of three-dimensional printing a three-dimensional object (or "method") can include iteratively applying individual build material layers of a build material including polyamide particles; based on a 3D object model, iteratively and selectively dispensing a fusing agent onto individual build material layers. The fusing agent can include a radiation absorber to generate heat from absorbed electromagnetic radiation and an aqueous liquid vehicle including water. The method can further include iteratively and selectively applying a flame retardant onto individual build material layers, where the flame retardant can include 9,10-dihydro-9-oxa-10-phosphaphenanthrene-10-oxide, and the flame retardant can be included at from about 5 wt % to about 30 wt % in the fusing agent, at from about 5 wt % to about 30 wt % in a flame retardant agent if present that is separate from the fusing agent, or at from about 5 wt % to about 30 wt % in the fusing agent and from about 5 wt % to about 30 wt % in the flame retardant agent. The method can further include iteratively and selectively exposing a powder bed to electromagnetic radiation to selectively fuse the polyamide particles of the build material in contact with the radiation absorber and form a fused polyamide polymer matrix at individual build material layers that are fused together to form a fused three-dimensional object. In an example, the flame retardant can be present in the fusing agent and the flame retardant can become incorporated throughout the fused polymer matrix of the fused three-dimensional object. In another example, the flame retardant can be present in a flame retardant agent and the flame retardant can become incorporated into only a portion of the fused polymer matrix of the fused three-dimensional object. In yet another example, the flame retardant can be applied to individual build material layers at a weight ratio of flame retardant to polyamide particles from about 1:10 to about 1:200. In a further example, the method can include dissolving the flame retardant in a C2-C4 lower alcohol to form a flame retardant solution used to form the fusing agent, the flame retardant agent if present, or both the fusing agent and the flame retardant agent.

In a further example, a three-dimensional printed object is presented. The three-dimensional printed object can include a fused polyamide polymer matrix, a radiation absorber dispersed within the fused polyamide polymer matrix, and from about 0.5 wt % to about 10 wt % of a flame retardant based on a total weight of the three-dimensional printed object within the fused polyamide polymer matrix. The flame retardant can include 9,10-dihydro-9-oxa-10-phosphaphenanthrene-10-oxide. In an example, the three-dimensional printed object can include a first portion and a second portion. The first portion can include the fused polyamide polymer matrix and the radiation absorber but not the flame retardant, and the second portion can include the fused polyamide polymer matrix, the radiation absorber, and the flame retardant agent.

When discussing the three-dimensional printing kit, method of printing a three-dimensional object, and/or the three-dimensional printed object herein, these discussions can be considered applicable to one another whether or not they are explicitly discussed in the context of that example. Thus, for example, when discussing a fusing agent related to a three-dimensional printing kit, such disclosure is also relevant to and directly supported in the context of the method of printing a three-dimensional object, the three-dimensional printed object, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

Figure 1:
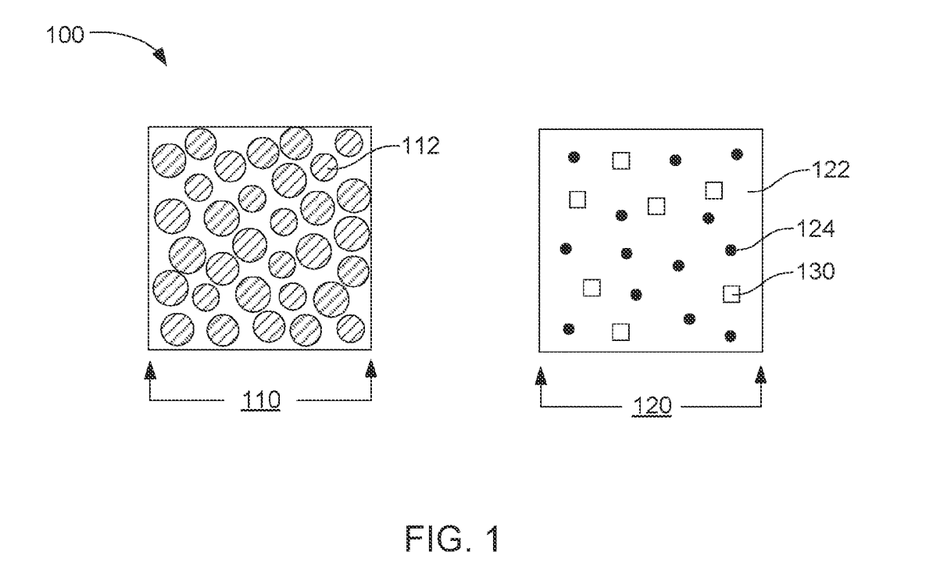
FIG. 1 is a schematic illustration of an example three-dimensional printing kit in accordance with the present disclosure.

A three-dimensional printing kit 100 is shown by way of example in FIG. 1. The three-dimensional printing kit can include, for example, a build material 110, a fusing agent 120, and a flame retardant 130. The build material may include polyamide particles 112. The fusing agent can include an aqueous liquid vehicle 122 including water and a radiation absorber 124 to generate heat from absorbed electromagnetic radiation. The flame retardant can include 9,10-dihydro-9-oxa-10-phosphaphenanthrene-10-oxide. The flame retardant may be included at from about 5 wt % to about 30 wt % in the fusing agent (as illustrated in FIG. 1), at from about 5 wt % to about 30 wt % in a flame retardant agent if present that is separate from the fusing agent, or at from about 5 wt % to about 30 wt % in the fusing agent and from about 5 wt % to about 30 wt % in the flame retardant agent.

In some examples, the three-dimensional printing kit can further include other fluids, such as a flame retardant agent, coloring agent, detailing agent, or the like. A flame retardant agent for example, can include the flame retardant dispersed or dissolved in an aqueous liquid vehicle. The flame retardant agent can be applied to portions of the build material where flame retardancy is desired. In some examples, the flame retardant agent can be applied to only a portion of the build material that forms the three-dimensional printed object, or can be applied to all of the build material that forms the three-dimensional printed object. The flame retardant agent may be applied at different concentrations to different portions of the build material that form the three-dimensional printed object.

A detailing agent, for example, can include a detailing compound, which can be a compound that can reduce the temperature of the build material when applied thereto. In some examples, the detailing agent can be applied around edges of the application area of the fusing agent. This can prevent caking around the edges of the application area of the fusing agent due to heat from the area where the fusing agent was applied. The detailing agent can also be applied in the same area where fusing agent was applied in order to control the temperature and prevent excessively high temperatures when the build material is fused.

The build material may be packaged or co-packaged with the fusing agent, flame retardant agent, coloring agent, detailing agent, or the like in separate containers, and/or can be combined with the fusing agent at the time of printing.

Build Materials

The build material can be used as the bulk material of the three-dimensional printed object. As mentioned, the build material can include from about 80 wt % to 100 wt % polyamide particles. In another example, the build material can include from about 85 wt % to about 95 wt %, from about 90 wt % to 100 wt %, or 100 wt % polyamide particles. The build material can also include ceramic particles, metal particles, other polymer particles, or a combination thereof in an amount up to 20 wt %.

In an example, the polyamide particles can be selected from polyamide-6, polyamide-9, polyamide-11, polyamide-12, polyamide-66, polyamide-612, polyamide-812, polyamide-912, thermoplastic polyamide, or a combination thereof. In another example, the polyamide particles can be selected from polyamide-6, polyamide-9, polyamide-11, polyamide-12, thermoplastic polyamide, or a combination thereof. In a further example, the polyamide particles can include polyamide-12.

The build material may include similarly sized particles or differently sized particles. The term "size" or "particle size," as used herein, refers to the diameter of a substantially spherical particle, or the effective diameter of a non-spherical particle, e.g., the diameter of a sphere with the same mass and density as the non-spherical particle as determined by weight. A substantially spherical particle, e.g., spherical or near-spherical, can have a sphericity of >0.84. Thus, any individual particles having a sphericity of <0.84 can be considered non-spherical (irregularly shaped). For example, the polyamide particles can have a D50 particle size from about 2 μm to about 150 μm, from about 25 μm to about 125 μm, from about 50 μm to about 150 μm, or from about 20 μm to about 80 μm. D50 particle sizes are based on the equivalent spherical volume of the polymer particles. D50 particle sizes can be measured by laser diffraction, microscope imaging, or other suitable methodology, but in some examples, the particle size (or particle size distribution) can be measured and/or characterized using a Malvern™ Mastersizer™. This tool considers particle sizes based on diameter of the equivalent spherical volume of the polymer particles when the polymer particles are not spherical, e.g., having about a 1:1 aspect ratio.

The build material can, in some examples, further include flow additives, antioxidants, inorganic filler, or any combination thereof. Typically, an amount of any of these or other similar components can be at about 5 wt % or less. Example flow additives can include fumed silica, and/or the like. Example antioxidants can include hindered phenols, phosphites, thioethers, hindered amines, and/or the like. Example inorganic filler can include particles such as alumina, silica, fibers, carbon nanotubes, cellulose, and/or the like. Some additives may be found in multiple categories of additives, e.g., fumed silica can be a flow additive as well as a filler. In some examples, the filler or other type of additive can become embedded or composited with the polyamide particles.

The build material can be capable of being printed to form three-dimensional objects with a resolution of about 10 μm to about 150 μm, about 20 μm to about 100 μm, or about 25 μm to about 80 μm. As used herein, "resolution" refers to the size of the smallest feature that can be formed on a three-dimensional object. The build material can form layers from about 10 μm to about 150 μm thick, depending on the size of polyamide particles present in the build material, thus allowing the fused layers of the printed object to have about the same thickness or a few to many times (e.g., 2 to 20 times) thicker than the D50 particle size of the polyamide particles, for example. This can provide a resolution in the z-axis direction (e.g., the direction of the buildup of layers) of about 10 µm to about 150 µm. In some examples, however, the build material can also have a sufficiently small particle size and sufficiently uniform particle shape to provide an x- and y-axis resolution about the size of the polyamide particle size, e.g., about 2 µm to about 150 µm (e.g., the axes parallel to the support surface of the build platform).

Fusing Agents

In further detail, regarding the fusing agent 120 that may be utilized in the three-dimensional printing kits, methods of printing a three-dimensional object, or in fusing the polyamide polymer matrix of the three-dimensional printed object, as described herein, the fusing agent can include a radiation absorber to generate heat from absorbed electromagnetic radiation and an aqueous liquid vehicle.

In further detail, the fusing agent can include a radiation absorber. An amount of radiation absorber in the fusing agent can vary depending on the type of radiation absorber. In some examples, an amount of radiation absorber in the fusing agent can be from about 0.1 wt % to about 10 wt %. In another example, the amount can be from about 0.5 wt % to about 7.5 wt %. In yet another example, the amount can be from about 1 wt % to about 10 wt %. In a particular example, the amount can be from about 0.5 wt % to about 5 wt %.

Example radiation absorbers can include carbon black, a metal dithiolene complex, a near-infrared absorbing dye, a near-infrared absorbing pigment, metal nanoparticles, a conjugated polymer, or a combination thereof. In an example, the radiation absorber can be carbon black. In some examples, the radiation absorber can be colored or colorless.

Examples of near-infrared absorbing dyes can include aminium dyes, tetraaryldiamine dyes, cyanine dyes, pthalocyanine dyes, dithiolene dyes, and others. A variety of near-infrared absorbing pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2. For example, $M_2P_2O_7$ can include compounds such as $Cu_2P_2O_7$, $Cu/MgP_2O_7$, $Cu/ZnP_2O_7$, or any other suitable combination of counterions. The phosphates described herein are not limited to counterions having a +2 oxidation state. Other phosphate counterions can also be used to prepare other suitable near-infrared pigments. Additional near-infrared absorbing pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. The silicates described herein are not limited to counterions having a +2 oxidation state. Other silicate counterions can also be used to prepare other suitable near-infrared pigments.

In an example, the aqueous liquid vehicle can include water. In another example the aqueous liquid vehicle can include water and an organic co-solvent. In one example, the aqueous liquid vehicle can include from about 25 wt % to about 90 wt % or from about 30 wt % to about 75 wt % water, and from about 5 wt % to about 60 wt % or from about 10 wt % to about 50 wt % organic co-solvent. In an example, the aqueous liquid vehicle can include organic-solvent to water at a ratio from about 2:1 to about 1:2, from about 1:1 to about 1:2, from about 1:1 to about 1:1.5 or from about 1:1 to about 1:1.25. In further detail, the aqueous liquid vehicle can be as described below.

Flame Retardants

The flame retardant, in further detail, can include 9,10-dihydro-9-oxa-10-phosphaphenanthrene-10-oxide, a.k.a. DOPO. DOPO is a non-halogenated compound and can have the structure shown in Formula (I) below.

(I)

The organophosphorus groups are believed to contribute to the flame retardant properties of DOPO. DOPO has an ability to produce intumescent char upon flame-induced decomposition.

DOPO can be dissolved in a C2-C4 alcohol. For example, the DOPO can be dissolved in ethanol, propanol, butanol, or an admixture thereof. In one example, the DOPO may be dissolved in ethanol. DOPO can be dissolved in the alcohol at a weight range of from about 5 wt % to about 25 wt %, from about 10 wt % to about 20 wt %, from about 5 wt % to about 15 wt %, or from about 8 wt % to about 12 wt %.

Once dissolved, the DOPO can be incorporated into a fluid agent. For example, the DOPO can be incorporated into a fusing agent, flame retardant agent, or both the fusing agent and the flame retardant agent. In an example, the flame retardant can be present in a fusing agent. In another example, the flame retardant can be present in the flame retardant agent. In a further example, the flame retardant can be present in a fusing agent and a flame retardant agent. Incorporating the flame retardant in a fluid agent can permit voxel basis application of the flame retardant and can ensure controlled distribution of the flame retardant. Incorporating the flame retardant in a fluid agent can also permit the application of additional flame retardant at portions of the three-dimensional object formed thereof that may be more susceptible to ignition, such as at thinner cross-sections and overhangs of the three-dimensional printed object formed. In some examples, this can permit additional flame retardant to be added to a build material that includes flame retardant admixed therein when forming the three-dimensional printed object.

The flame retardant may be present in a liquid agent at from about 5 wt % to about 30 wt %, from about 15 wt % to about 25 wt %, from about 5 wt % to about 15 wt %, from about 10 wt % to about 20 wt %, from about 15 wt % to about 30 wt %, or from about 5 wt % to about 20 wt %.

Flame Retardant Agent

In further detail, regarding the flame retardant agent that may be utilized in the three-dimensional printing kits, methods of printing a three-dimensional object, or incorporated into the fused polyamide polymer matrix of the three-dimensional printed object, as described herein, the flame retardant agent can include the flame retardant and an aqueous liquid vehicle. The flame retardant can be as described above. The aqueous liquid vehicle can be as described below.

An amount of flame retardant in the flame retardant agent can vary depending on the desired concentration of the flame retardant in the fused three-dimensional printed object formed. In some examples, an amount of flame retardant in the flame retardant agent can be from about 0.1 wt % to about 10 wt %. In another example, the amount can be from about 0.5 wt % to about 7.5 wt %. In yet another example, the amount can be from about 1 wt % to about 10 wt %. In a particular example, the amount can be from about 0.5 wt % to about 5 wt %.

Detailing Agents

In some examples, the three-dimensional printing kit and/or the method of printing a three-dimensional object can further include a detailing agent and/or the application thereof. A detailing agent can include a detailing compound capable of cooling the build material upon application. In some examples, the detailing agent can be printed around the edges of the portion of a build material or can be printed with the fusing agent. The detailing agent can increase selectivity between the fused and un-fused portions of the build material by reducing the temperature of the build material around the edges of the portion to be fused. In other examples, the detailing agent can be printed in areas where the fusing agent is printed to provide additional cooling when printing a three-dimensional object.

In some examples, the detailing agent can be a solvent that can evaporate at the temperature of the build material supported on the powder bed or build platform. As mentioned above, in some cases, the build material in the powder bed can be preheated to a preheat temperature within about 10° C. to about 70° C. of the fusing temperature of the build material. Thus, the detailing agent can be a solvent that evaporates upon contact with the build material at the preheat temperature, thereby cooling the printed portion through evaporative cooling. In certain examples, the detailing agent can include water, co-solvents, or combinations thereof. In further examples, the detailing agent can be substantially devoid of radiation absorbers. That is, in some examples, the detailing agent can be substantially devoid of ingredients that absorb enough energy from the energy source to cause the build material to fuse. In certain examples, the detailing agent can include colorants such as dyes or pigments, but in small enough amounts such that the colorants do not cause the build material printed with the detailing agent to fuse when exposed to the energy source.

Aqueous Liquid Vehicles

As used herein, the term "aqueous liquid vehicle" may refer to the liquid in the fusing agent, the flame retardant agent, the detailing agent, and/or other fluid agents that may be present, e.g., coloring agent. The aqueous liquid vehicle may include water alone or in combination with a variety of additional components. For example, the aqueous liquid vehicle may be water, or may include water and organic co-solvent. Examples of components that may be included, in addition to water, may include organic co-solvent, surfactant, buffer, antimicrobial agent, anti-kogation agent, chelating agent, buffer, etc. In an example, the aqueous liquid vehicle can include water and organic co-solvent. In another example, the aqueous liquid vehicle can include water, organic co-solvent, and a surfactant. In yet another example, the aqueous liquid vehicle can include water, organic co-solvent, surfactant, and buffer (or buffer and a chelating agent).

The aqueous liquid vehicle can include water that may be deionized, for example. In one example, water can be present in the fluid agent at a weight percentage that can vary from about 25 wt % to about 100 wt %, from about 25 wt % to about 90 wt %, from about 30 wt % to about 75 wt %, from about 50 wt % to about 80 wt %, from about 70 wt % to about 100 wt %, or from about 60 wt % to about 90 wt %.

The aqueous liquid vehicle may include organic co-solvent(s). Some examples of organic co-solvent(s) that may be added to the aqueous liquid vehicle include 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), or a combination thereof. In one example, the organic co-solvent can include 2-pyrrolidonone. Whether a single co-solvent is used or a combination of co-solvents is used, the total amount of co-solvent(s) in the fusing agent, the flame retardant agent, the detailing agent, or other fluid agent can be from about 5 wt % to about 60 wt %, from about 10 wt % to about 50 wt %, from about 15 wt % to about 45 wt %, from about 5 wt % to about 25 wt %, or from about 30 wt % to about 50 wt % based on a total weight percentage of the fluid agent.

The aqueous liquid vehicle may also include surfactant. The surfactant can include non-ionic surfactant, cationic surfactant, and/or anionic surfactant. In one example, the fluid agent can include an anionic surfactant. In another example, the fluid agent can include a non-ionic surfactant. In still another example, the fluid agent can include a blend of both anionic and non-ionic surfactants. Examples of non-ionic surfactant that can be used can include self-emulsifiable, nonionic wetting agent based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Still other surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), and oleth-3 phosphate surfactant (e.g., CRODAFOS™ N3 Acid from Croda, UK). Example cationic surfactants that can be used can include dodecyltrimethylammonium chloride, hexadecyldimethylammonium chloride, or a combination thereof. In some examples, the surfactant (which may be a blend of multiple surfactants)

may be present in the fusing agent, the flame retardant agent, the detailing agent, or other fluid agent at an amount ranging from about 0.01 wt % to about 2 wt %, from about 0.05 wt % to about 1.5 wt %, from about 0.75 wt % to about 1.25 wt %, or from about 0.01 wt % to about 1 wt %.

In some examples, the aqueous liquid vehicle may also include a chelating agent, an antimicrobial agent, a buffer, or a combination thereof. While the amount of these may vary, if present, these can be present in the fusing agent, the flame retardant agent, the detailing agent, or other fluid agent at an amount ranging from about 0.001 wt % to about 20 wt %, from about 0.05 wt % to about 10 wt %, or from about 0.1 wt % to about 5 wt %.

The aqueous liquid vehicle may include a chelating agent. Chelating agent(s) can be used to minimize or to eliminate the deleterious effects of heavy metal impurities. Examples of suitable chelating agents can include disodium ethylenediaminetetraacetic acid (EDTA-Na), ethylene diamine tetra acetic acid (EDTA), and methyl-glycinediacetic acid (e.g., TRILON® M from BASF Corp., Germany). If included, whether a single chelating agent is used or a combination of chelating agents is used, the total amount of chelating agent(s) in the fusing agent, the flame retardant agent, the detailing agent, or other fluid agent may range from 0.01 wt % to about 2 wt % or from about 0.01 wt % to about 0.5 wt %.

The aqueous liquid vehicle may also include antimicrobial agents. Antimicrobial agents can include biocides and fungicides. Example antimicrobial agents can include the NUOSEPT®, Ashland Inc. (USA), VANCIDER (R.T. Vanderbilt Co., USA), ACTICIDE® B20 and ACTICIDE® M20 (Thor Chemicals, U.K.), PROXEL® GXL (Arch Chemicals, Inc. USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In an example, if included, a total amount of antimicrobial agents in the fluid agent can range from about 0.01 wt % to about 1 wt %.

In some examples, the aqueous liquid vehicle may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5. In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N, N'N'-tetrakis-(2-hydroxyethyl)-ethylenediamine and N, N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added in the fluid agent at an amount ranging from about 0.01 wt % to about 10 wt %, from about 0.1 wt % to about 7.5 wt %, or from about 0.05 wt % to about 5 wt %.

Methods of Printing Three-Dimensional Objects

Figure 2:
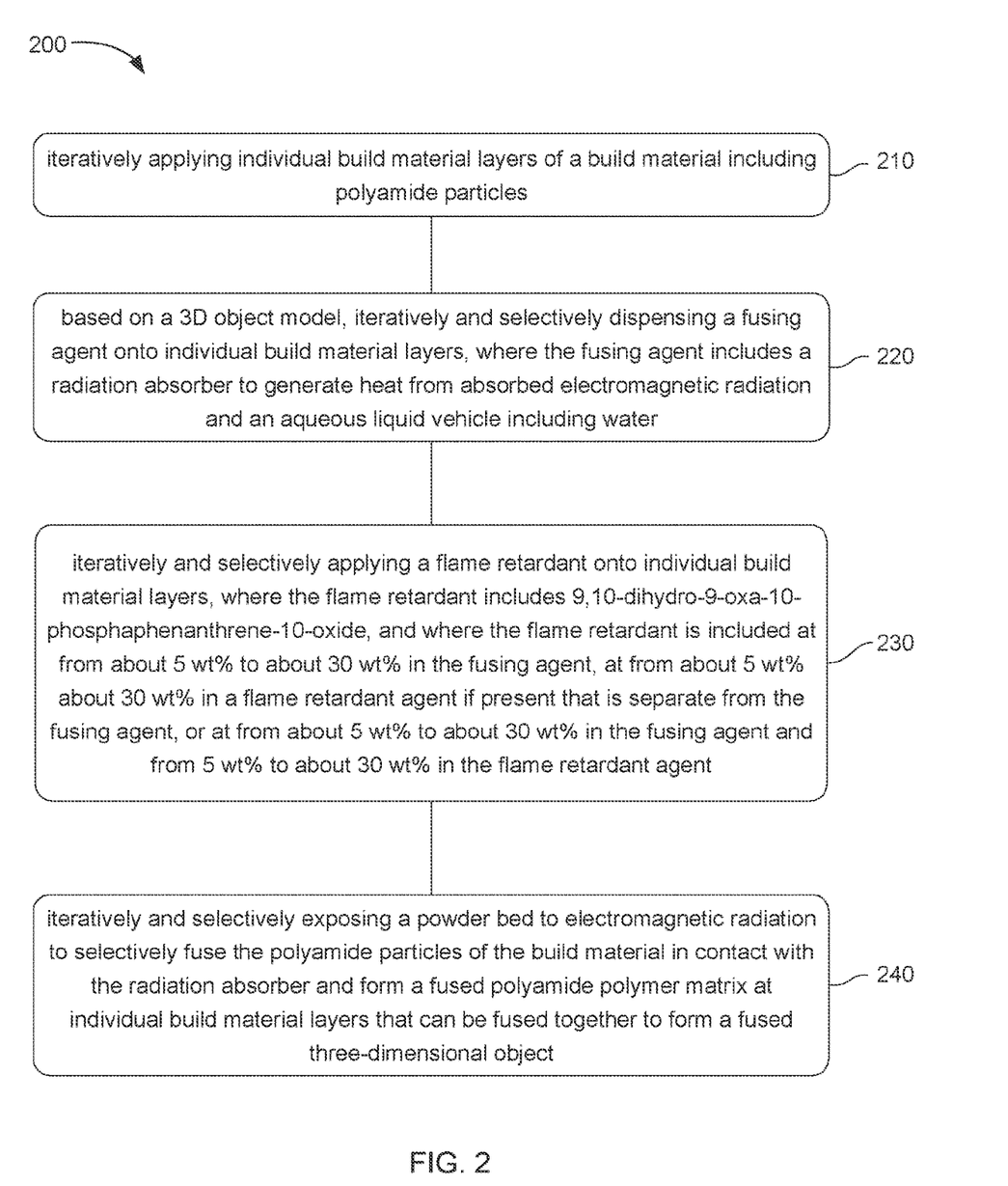
FIG. 2 is a flow diagram illustrating an example method of printing a three-dimensional object in accordance with the present disclosure.

A flow diagram of an example method 200 of three-dimensional (3D) printing is shown in FIG. 2. The method can include iteratively 210 applying individual build material layers of a build material including polyamide particles; based on a 3D object model, iteratively and selectively 220 dispensing a fusing agent onto individual build material layers, where the fusing agent can include a radiation absorber to generate heat from absorbed electromagnetic radiation and an aqueous liquid vehicle including water; iteratively and selectively 230 applying a flame retardant onto individual build material layers, where the flame retardant includes 9,10-dihydro-9-oxa-10-phosphaphenanthrene-10-oxide, and where the flame retardant can be included at from about 5 wt % to about 30 wt % in the fusing agent, at from about 5 wt % to about 30 wt % in a flame retardant agent if present that is separate from the fusing agent, or at from about 5 wt % to about 30 wt % in the fusing agent and from about 5 wt % to about 30 wt % in the flame retardant agent; and iteratively and selectively 240 exposing a powder bed to electromagnetic radiation to selectively fuse the polyamide particles of the build material in contact with the radiation absorber and form a fused polyamide polymer matrix at individual build material layers that can be fused together to form a fused three-dimensional object.

In printing in a layer-by-layer manner, the build material can be spread, the fusing agent applied, the flame retardant applied, the layer of the build material can be exposed to energy, and then a build platform can then be dropped a distance of 5 μm to 1 mm, which can correspond to the thickness of a printed layer of the three-dimensional object, so that another layer of the build material can be added again thereon to receive another application of fusing agent, flame retardant, detailing agent, and so forth. During the build, the radiation absorber in the fusing agent can act to convert the energy to thermal energy and promote the transfer of thermal heat to polyamide particles of the build material in contact with the fusing agent including the radiation absorber. In an example, the fusing agent can elevate the temperature of the polyamide particles of the build material above the melting or softening point of the polyamide particles, thereby allowing fusing (e.g., sintering, binding, curing, etc.) of the build material (or polyamide particles thereof) and the formation of an individual layer of the three-dimensional object. The method can be repeated until all the individual build material layers have been created and a three-dimensional printed object is formed.

Application of the flame retardant to the build material may occur simultaneously with the application of the radiation absorber if the flame retardant is admixed in the fusing agent. Application of the flame retardant to the build material may also occur separate from the application of the radiation absorber in a fusing agent by excluding flame retardant from the fusing agent and incorporating the flame retardant in a separate flame retardant agent. Application of the flame retardant in a flame retardant agent can allow for controlled distribution of the flame retardant to the three-dimensional printed object formed. For example, when the flame retardant is excluded from the fusing agent and included solely in a flame retardant agent, the flame retardant may be applied to select portions of the three-dimensional printed object that can be formed while excluding flame retardant from other portions of the three-dimensional printed object that can be formed. For example the flame retardant may be applied to an exterior shell of the three-dimensional printed object while an interior core of the three-dimensional printed object may exclude the flame retardant. In another example, the flame retardant may be applied to overhangs or portions of the three-dimensional printed object that have a thinner cross-section than a cross-section of the three-dimensional printed object at other portions. In yet another example, the flame retardant can be applied as part of the fusing agent and as part of a separate flame retardant agent. This may allow the flame retardant to be applied at different concentrations to different portions of the build material that form the three-dimensional printed object. For example, an exterior shell of the three-dimensional printed object formed may include a greater concentration of flame retardant than a concentration of flame retardant at an interior core of the three-dimensional printed object.

In one example, the method can further include iteratively and selectively dispensing a detailing agent onto individual build material layers laterally at a border between a first area where the individual build material layer was contacted by the fusing agent and a second area where the individual build material layer was not contacted by the fusing agent. This can prevent caking around the edges due to heat from the area where the fusing agent was applied. The detailing agent can also be applied in the same area where the fusing agent was applied in order to control the temperature and prevent excessively high temperatures when the build material is fused.

In yet another example, the method can further include, iteratively and selectively dispensing a coloring agent including a pigment or dye onto individual build material layers where coloring is desired. This can allow for controlled application of a colorant to desired locations of the three-dimensional printed object. This can permit the formation of multiple colored three-dimensional printed objects.

In some examples, the method can further include heating the build material prior to dispensing the individual build material layers. The heating can be to a temperature less than the melting or softening point of the polyamide particles of the build material and can reduce an amount that the temperature of the build material must be raised during fusing of the build material.

Three-Dimensional Printed Objects

Figure 3:
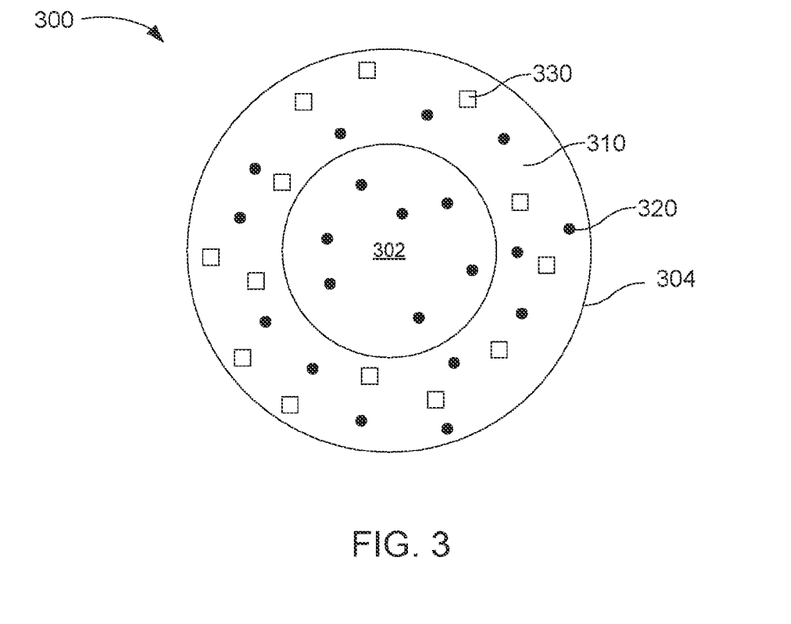
FIG. 3 is a 2-dimensional cross-sectional view of a three-dimensional printed object in accordance with the present disclosure.

Also presented herein is a three-dimensional printed object, as illustrated in a cross-sectional view in FIG. 3. The three-dimensional printed object 300 can include a fused polyamide polymer matrix 310, a radiation absorber 320 dispersed within the fused polyamide polymer matrix, and from about 0.5 wt % to about 10 wt % of a flame retardant 330 based on a total weight of the three-dimensional printed object within the fused polyamide polymer matrix, where the flame retardant includes 9,10-dihydro-9-oxa-10-phosphaphenanthrene-10-oxide. The fusing agent and the flame retardant may be dispersed in the fused polyamide polymer matrix as distinct individual particles as illustrated in FIG. 3, or may coalesce with the fused polyamide polymer matrix such that the fusing agent and/or the flame retardant may not be readily distinguished from the fused polyamide polymer matrix. The three-dimensional printed object may be formed from the three-dimensional printing kit and/or using the method of printing a three-dimensional object described above.

In an example, the flame retardant may be dispersed throughout the three-dimensional printed object. In some examples, the flame retardant may be dispersed at different concentrations in different portions of the three-dimensional printed object. In yet other examples, the flame-retardant may be located at selected portions of the three-dimensional printed object. For example, as illustrated in FIG. 3, the three-dimensional printed object can include a first portion 302, and a second portion 304. The first portion can include the fused polyamide polymer matrix and the radiation absorber but not the flame retardant, and the second portion can include fused polyamide polymer matrix, the radiation absorber, and the flame retardant agent. In some examples, the first portion may be an interior core of the three-dimensional printed object and the second portion may be an exterior shell that surrounds the interior core of the three-dimensional printed object.

The flame retardant can be included in the three-dimensional printed object at from about 0.5 wt % to about 10 wt %, from about 0.5 wt % to about 5 wt %, from about 2 wt % to about 8 wt %, or from about 5 wt % to about 10 wt %. The amount of flame retardant in the three-dimensional printed object can be based on a total weight of the three-dimensional printed object. In some examples, a concentration of the flame retardant may vary throughout different portions of the three-dimensional printed object.

The three-dimensional printed object can be flame retardant in accordance with various flammability standards, such as those standards for safety and flammability of plastic materials for parts set forth by Underwriters Laboratories (UL) of the United States. Thus, in some examples, the three-dimensional printed object formed can prevent or slow further development of ignition of the object when ignited. The flame retardant property of the three-dimensional printed object herein can be an enhancement relative to a three-dimensional printed object formed from the same polyamide build material and fusing agent, but which excludes the flame retardant, for example. Example flame retardancy standards can relate to the tendency of the three-dimensional printed object to extinguish or reduce the spread of a flame once the material is ignited. In an example, the three-dimensional printed object can exhibit a flame retardancy rating of a UL 94 V-0 (IEC 60695-11-108). This rating can indicate that burning stops within ten seconds on a vertical specimen having a thickness of at least 2 mm. Drips of particles are allowed as long as they are not inflamed. A specimen that is less than 2 mm thick and fails the UL94 V-0 standard but passes as a comparable 2 mm thick specimen may obtain a UL94 V-0 rating.

In another example, the three-dimensional printed object can exhibit a flame retardancy rating of UL 94 V-1 (IEC 60695-11-108). This rating can indicate that burning stops within thirty seconds on a vertical specimen and drips of particles are allowed as long as they are not inflamed. In yet another example, the three-dimensional printed object can exhibit a flame retardancy rating of UL 94 V-2 (IEC 60695-11-108). This rating indicates that burning stops within thirty seconds on a vertical specimen and drips of flaming particles are allowed.

To determine whether the standard for a three-dimensional printed object is met, the materials and processes used to generate the object can be used to prepare a standard sized object that can be from about 4 mm thick to about 0.8 mm thick. In an example, the thickness can be about 4 mm. To achieve a UL94 V-0 rating, the object should be at least 2 mm thick and meet the standards for UL94 V-0 perimeters outlined above. The flame height of the ignition source can be 20 mm and the flame can be applied twice for ten seconds each time. The second flame can be applied as soon as the first burning ends. After applying the flame, the material can be indicated as failing the testing, or can be rated as UL 94 V-2, UL 94 V-1, or UL 94 V-0, based on the criteria set forth above. In one example, the three-dimensional printed object can be of a material rated as UL 94 V-2 or better, or as UL 94 V-1 or better, or UL 94 V-0 or better, for example. In some examples, the three-dimensional object can be a material rated under the UL94 blue card standards.

Three-Dimensional Printing Systems

Figure 4:
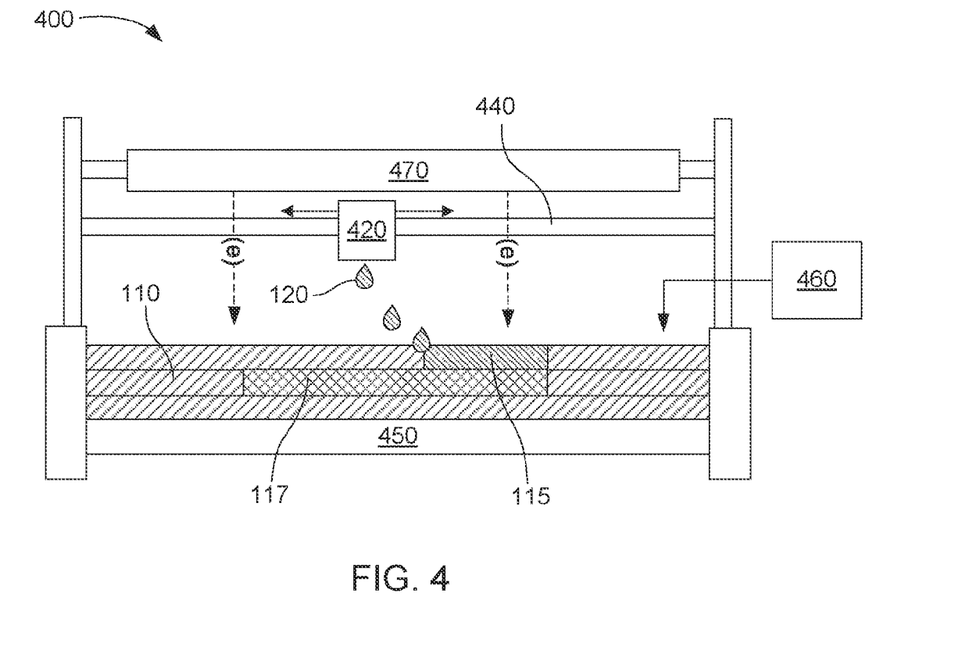
FIG. 4 is a schematic illustration of an example three-dimensional printed object in accordance with the present disclosure.

A three-dimensional printing system ("system") 400, as shown in FIG. 4, can include a build material 110, a fusing agent fluid applicator 420, and a fusing agent 120. The build material can include polyamide particles. The fusing agent fluid applicator can be coupled or coupleable to a fusing agent. The fusing agent can include an aqueous liquid vehicle including water and a radiation absorber to generate heat from absorbed electromagnetic radiation. A flame retardant (not illustrated) can include 9,10-dihydro-9-oxa-10-phosphaphenanthrene-10-oxide and can be included in the system. The flame retardant may be included in the fusing agent, and/or the system may further include a flame retardant agent and a flame retardant agent fluid applicator. In some examples, the system can include the flame retardant in the fusing agent, a flame retardant agent including the flame retardant, and a flame retardant fluid applicator.

In further detail, the fluid applicator (the fusing agent fluid applicator and/or the flame retardant fluid applicator) can be a digital fluid ejector, e.g., thermal or piezo jetting architecture. The fluid applicator, in an example, can be fluidly coupled or coupleable to the fusing agent and/or the flame retardant agent to iteratively apply the fusing agent and/or the flame retardant agent to the build material to form individually patterned object layers, 115. The fluid applicator can be any type of apparatus capable of selectively dispensing or applying the fusing agent and/or a flame retardant agent. For example, the fluid applicator can be a fluid ejector or digital fluid ejector, such as an inkjet printhead. e.g., a piezo-electric printhead, a thermal printhead, a continuous printhead, etc. The fluid applicator could likewise be a sprayer, a dropper, or other similar structure for applying the fusing agent, the flame retardant agent, the detailing agent, or a combination thereof to the build material. Thus, in some examples, the application can be by jetting or ejecting from a digital fluid jet applicator, similar to an inkjet pen.

In an example, the fluid applicator can be located on a carriage track 440, but the fluid applicator could be supported by any of a number of structures. In yet another example, the fluid applicator can include a motor and can be operable to move back and forth, and the fluid applicator can also be moved front to back as well, to provide both x- and y-axis movement over the build material when positioned over or adjacent to a build material on a powder bed of a build platform.

In an example, the three-dimensional printing system can further include a build platform 450 to support the build material. The build platform can be positioned to permit application of the fusing agent from the fusing agent fluid applicator, the application of the flame retardant from the flame retardant fluid applicator, and/or the detailing agent from a detailing agent applicator onto a layer of the build material. The build platform can be configured to drop in height, thus allowing for successive layers of the build material to be applied by a supply and/or spreader 460. The build material can be layered in the build platform at a thickness that can range from about 5 μm to about 1 mm. In some examples, individual layers can have a relatively uniform thickness. In one example, a thickness of a layer of the build material can range from about 10 μm to about 500 μm or from about 30 μm to about 200 μm. Furthermore, heat can be applied to the build platform, or from any other direction or time, to bring the build material to a temperature near its fusing temperature, making it easier to bring up the temperature enough to generate fusion of the build material. For example, heat may be applied to the build material in the powder bed from the build platform, from above, or to the build material prior to being spread on the powder bed to preheat the build material within about 10° C. to about 70° C. of the fusing temperature of the polyamide particles so that less energy may be applied to bring the polyamide particles to their fusing temperature.

Following the selective application of a fusing agent to the build material, the build material can be exposed to energy from an electromagnetic radiation source. The system can include an electromagnetic radiation source 470 that can be positioned to expose the individual layers of the build material to radiation energy (e) to selectively fuse polyamide particles of the build material in contact with the radiation absorber (forming fused layers, 117) to iteratively form a three-dimensional object. The radiation source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In one example, the emitted electromagnetic radiation can have a wavelength that can range from about 400 nm to about 2 μm. In some examples, the radiation source can be operatively connected to a lamp/laser driver, an input/output temperature controller, and/or temperature sensors.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "dispensing" when referring to fusing agent that may be used, for example, refers to any technology that can be used to put or place the fluid, e.g., fusing agent, on the build material or into a layer of build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc.

Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of Fusing Agents

Two fusing agent formulations were prepared by admixing the components in Tables 1 and 2 below. Prior to adding the flame retardant to the first fusing agent, DOPO (9,10-dihydro-9-oxa-10-phosphaphenanthrene-10-oxide) was dissolved in ethanol at 10 wt %. The ethanol and DOPO solution was then admixed into a fusing agent. Table 1 is an example fusing agent prepared in accordance with the present disclosure, and Table 2 represents a "Control" fusing agent without a flame retardant compound.

TABLE 1

Fusing Agent with Flame Retardant

| Component* | Component Type | Amount (wt %) |
|---|---|---|
| DOPO (10 wt % ETOH solution) | Flame Retardant | 16.67 |
| Carbon Black Dispersion Cab-o-jet IJX-399-2 | Radiation Absorber | 5 |
| Water | Solvent | 57.26 |
| 2-Pyrrolidone | Organic Co-Solvent | 20 |
| Surfactant Blend | Surfactant | 0.93 |
| TRIS - Trizma ® | Buffer | 0.10 |
| Trilon M ® | Chelator | 0.04 |

*TRIZMA ® sold by Sigma-Aldrich, USA and TRILON ® M is commercially available from BASF Corp., Germany

TABLE 2

Control Fusing Agent

| Component | Component Type | Amount (wt %) |
|---|---|---|
| Carbon Black Dispersion Cab-o-jet IJX-399-2 | Radiation Absorber | 5 |
| Water | Solvent | 73.93 |
| 2-Pyrrolidone | Organic Co-Solvent | 20 |
| Surfactant Blend | Surfactant | 0.93 |
| TRIS - Trizma ® | Buffer | 0.10 |
| Trilon M ® | Chelator | 0.04 |

* TRIZMA ® sold by Sigma-Aldrich, USA and TRILON ® M is commercially available from BASF Corp., Germany Example 2—Preparation of Three-Dimensional Objects Eight three-dimensional printed objects were prepared in the shape of dog bones (or barbells) using a build material having Nylon-12 (PA-12) particles. The fusing agents used with these build materials were the fusing agents prepared in accordance with Table 1 (with Flame Retardant) and Table 2 (Control without Flame Retardant) using a common set of printing conditions, e.g., fuse speeds of 22 inches per second per pass and from about 64-70 contone of the fusing agent. The powder bed was set to a temperature of 165° C. The dog bone objects were formed with an elongated middle section flanked by two end sections. The three-dimensional printed objects were printed using multi-jet fusion (MJF) printers with the fusing agent from Table 1 or Table 2, which were iteratively jetted layer-by-layer on the PA-12 polymer particles of the polymeric build material. An identical electromagnetic energy source was used to selectively form the dog bone objects which included multiple fused layers.

Example 3—Flammability Testing

The various dog bone samples prepared in accordance with Example 2 were evaluated for flammability (four formed with example fusing agent of Table 1 and four formed with Control fusing agent of Table 2). The testing was performed in accordance with a protocol similar to the UL94 standards, with the exception of the three-dimensional object dimensions. The samples were subjected to a 20 mm high flame for 10 seconds, removed from the flame, and the time for extinguishment to occur recorded. Once extinguished, the part was immediately subjected to a 20 mm high flame for 10 additional seconds and then removed from the flame, and then a second time for extinguishment to occur was recorded. The results are shown in Table 3 below.

TABLE 3

Flammability Test Results

| Sample | Fusing Agent | $1^{st}$ Extinguish Time (seconds) | $2^{nd}$ Extinguish Time (seconds) | Pass/Fail |
|---|---|---|---|---|
| A | w/Flame Retardant (Table 1) | 8 | >10 | No |
| B | w/Flame Retardant (Table 1) | <1 | 10 | No - dripping |
| C | w/Flame Retardant (Table 1) | 3 | 8 | Pass |
| D | w/Flame Retardant (Table 1) | 3 | 10 | Pass |

TABLE 3-continued

Flammability Test Results

| Sample | Fusing Agent | 1st Extinguish Time (seconds) | 2nd Extinguish Time (seconds) | Pass/Fail |
|---|---|---|---|---|
| E | Control (Table 2) | >10 | n/a - did not pass second burn | Fail |
| F | Control (Table 2) | >10 | n/a - did not pass second burn | Fail |
| G | Control (Table 2) | >10 | n/a - did not pass second burn | Fail |
| H | Control (Table 2) | >10 | n/a - did not pass second burn | Fail |

As can be seen above, all of the experimental samples A-D with the flame retardant incorporated therein passed the first flame event whereas the control samples E-H did not. In addition, samples E-H did not pass the second flame event, as these samples were completely engulfed in the first flame event. Samples A and B did not pass the second flame event; however, samples C and D passed the second flame event. The partial passing of the samples formed with the flame retardant indicates that optimization of the fusing agent formulation to include a maximal incorporation of flame retardant should allow for consistent passing of the flammability testing.

What is claimed is:

1. A three-dimensional printing kit, comprising:
a build material including polyamide particles;
a fusing agent comprising a radiation absorber to generate heat from absorbed electromagnetic radiation and an aqueous liquid vehicle including water; and
a flame retardant solution including 9,10-dihydro-9-oxa-10-phosphaphenanthrene-10-oxide dissolved in a C2-C4 lower alcohol, wherein;
  i) the flame retardant solution is present in the fusing agent; or
  ii) the flame retardant solution is a separate agent; or
  iii) the flame retardant solution is in both of the fusing agent and a separate agent.

2. The three-dimensional printing kit of claim 1, wherein the polyamide particles have a D50 particle size ranging from about 2 μm to about 150 μm.

3. The three-dimensional printing kit of claim 1, wherein a polyamide of the polyamide particles is selected from the group consisting of polyamide-6, polyamide-9, polyamide-11, polyamide-12, polyamide-66, polyamide-612, polyamide-812, polyamide-912, thermoplastic polyamide, and a combination thereof.

4. The three-dimensional printing kit of claim 1, wherein the radiation absorber is selected from the group consisting of carbon black, a metal dithiolene complex, a near-infrared absorbing dye, a near-infrared absorbing pigment, metal nanoparticles, a conjugated polymer, and a combination thereof.

5. The three-dimensional printing kit of claim 1, wherein the radiation absorber is present in the fusing agent in an amount ranging from about 0.1 wt % to about 10 wt %.

6. The three-dimensional printing kit of claim 1 wherein the flame retardant solution is present in the fusing agent in an amount ranging from about 15 wt % to about 25 wt % of the fusing agent.

7. The three-dimensional printing kit of claim 1, further comprising a detailing agent, wherein the detailing agent includes a detailing compound to reduce a temperature of the build material onto which the detailing agent is applied.

8. A method of printing a three-dimensional object, the method comprising:
iteratively applying individual build material layers of a build material including polyamide particles;
based on a 3D object model, iteratively and selectively dispensing a fusing agent onto individual build material layers, wherein the fusing agent comprises a radiation absorber to generate heat from absorbed electromagnetic radiation and an aqueous liquid vehicle including water;
iteratively and selectively applying a flame retardant solution onto individual build material layers, wherein the flame retardant solution includes 9,10-dihydro-9-oxa-10-phosphaphenanthrene-10-oxide dissolved in a C2-C4 lower alcohol, and wherein:
  i) the flame retardant solution is present in the fusing agent; or
  ii) the flame retardant solution is a separate agent; or
  iii) the flame retardant solution is in both of the fusing agent and a separate agent; and
iteratively and selectively exposing a powder bed to electromagnetic radiation to selectively fuse the polyamide particles of the build material in contact with the radiation absorber and form a fused polyamide polymer matrix at individual build material layers that are fused together to form the three-dimensional object.

9. The method of claim 8, wherein the flame retardant solution is present in the fusing agent and the 9,10-dihydro-9-oxa-10-phosphaphenanthrene-10-oxide becomes incorporated throughout the fused polymer matrix of the three-dimensional object.

10. The method of claim 8, wherein the flame retardant solution is the separate agent and the 9,10-dihydro-9-oxa-10-phosphaphenanthrene-10-oxide becomes incorporated into a portion of the fused polymer matrix of the three-dimensional object.

11. The method of claim 8, wherein the flame retardant solution is applied onto the individual build material layers at a weight ratio of the 9,10-dihydro-9-oxa-10-phosphaphenanthrene-10-oxide to the polyamide particles of from about 1:10 to about 1:200.

12. The method of claim 8, further comprising dissolving the 9,10-dihydro-9-oxa-10-phosphaphenanthrene-10-oxide in the C2-C4 lower alcohol to form the flame retardant solution.

13. A three-dimensional printed object formed by the method of claim 8, the three-dimensional printed object comprising;
the fused polyamide polymer matrix;
the radiation absorber dispersed within the fused polyamide polymer matrix; and
from about 0.5 wt % to about 10 wt % of the 9,10-dihydro-9-oxa-10-phosphaphenanthrene-10-oxide based on a total weight of the three-dimensional printed object within the fused polyamide polymer matrix.

14. A three-dimensional printed object, comprising:
a fused polyamide polymer matrix;
a radiation absorber dispersed within the fused polyamide polymer matrix; and
from about 0.5 wt % to about 10 wt % of a flame retardant based on a total weight of the three-dimensional printed object within the fused polyamide polymer matrix, wherein the flame retardant includes 9,10-dihydro-9-oxa-10-phosphaphenanthrene-10-oxide, wherein the three-dimensional printed object includes a first portion and a second portion, wherein the first portion includes the fused polyamide polymer matrix and the radiation absorber but not the flame retardant, and wherein the second portion includes fused polyamide polymer matrix, the radiation absorber, and the flame retardant.

15. The three-dimensional printing kit of claim 1, wherein the flame retardant solution is present in the fusing agent in an amount ranging from about 5 wt % to about 30 wt % and the 9,10-dihydro-9-oxa-10-phosphaphenanthrene-10-oxide is present in the flame retardant solution in an amount ranging from about 0.1 wt % to about 5 wt %.

16. The three-dimensional printing kit of claim 1, wherein the flame retardant solution is the separate agent and the 9,10-dihydro-9-oxa-10-phosphaphenanthrene-10-oxide is present in the separate agent in an amount ranging from about 0.1 wt % to about 5 wt %.

* * * * *